(12) United States Patent
Kuboi (10) Patent No.: US 6,941,034 B2
(45) Date of Patent: Sep. 6, 2005

(54) OPTICAL SWITCH AND ADJUSTMENT METHOD THEREOF

(75) Inventor: Toru Kuboi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/601,415

(22) Filed: Jun. 23, 2003

(65) Prior Publication Data

US 2004/0013347 A1 Jan. 22, 2004

(30) Foreign Application Priority Data

Jun. 25, 2002 (JP) .......................... 2002-184597

(51) Int. Cl.⁷ .............................. G02B 6/26; G02B 6/42
(52) U.S. Cl. ............................ 385/17; 385/18; 385/52
(58) Field of Search .................. 385/16–18, 52

(56) References Cited

U.S. PATENT DOCUMENTS 6,201,631 B1   3/2001   Greywall .................. 359/245
6,529,652 B1 * 3/2003   Brener ...................... 385/16

FOREIGN PATENT DOCUMENTS

EP   1 102 096 A2   5/2001   ............ G02B/6/35
EP   1102096 A2 *  5/2001   ............ G02B/6/35

* cited by examiner

Primary Examiner—Frank G. Font
Assistant Examiner—Derek Dupuis
(74) Attorney, Agent, or Firm—Scully, Scott, Murphy & Presser (57) ABSTRACT

The present invention is directed to an optical switch, which appropriately optically connects input side optical fibers with output side optical fibers. The optical switch comprises an input side array unit, and an output side array unit. The array unit on the input side has an input side fiber array, a mirror array, and a direction adjustment mechanism. The input side fiber array has signal input optical fibers and at least one adjustment optical fiber. The mirror array has tilt variable mirrors to deflect signal light beams from the signal input optical fibers and at least one fixed mirror to reflect an adjustment light beam from the adjustment optical fiber. The direction adjustment mechanism adjusts a relative direction of the mirror array with respect to the input side fiber array. The array unit on the output side has an output side fiber array having signal output optical fibers.

5 Claims, 9 Drawing Sheets

OPTICAL SWITCH AND ADJUSTMENT METHOD THEREOF

CROSS-REFERENCE TO RELATED APPLICATIONS

This application is based upon and claims the benefit of priority from the prior Japanese Patent Application No. 2002-184597, filed Jun. 25, 2002, the entire contents of which are incorporated herein by reference.

BACKGROUND OF THE INVENTION

1. Field of the Invention

The present invention relates to an optical switch including a micro electro mechanical system mirror array (MEMS mirror array) utilized in an optical communication system.

2. Description of the Related Art

EP 1 102 096 A2 discloses a conventional optical switch. This optical switch will be described with reference to FIG. 12.

Figure 12:
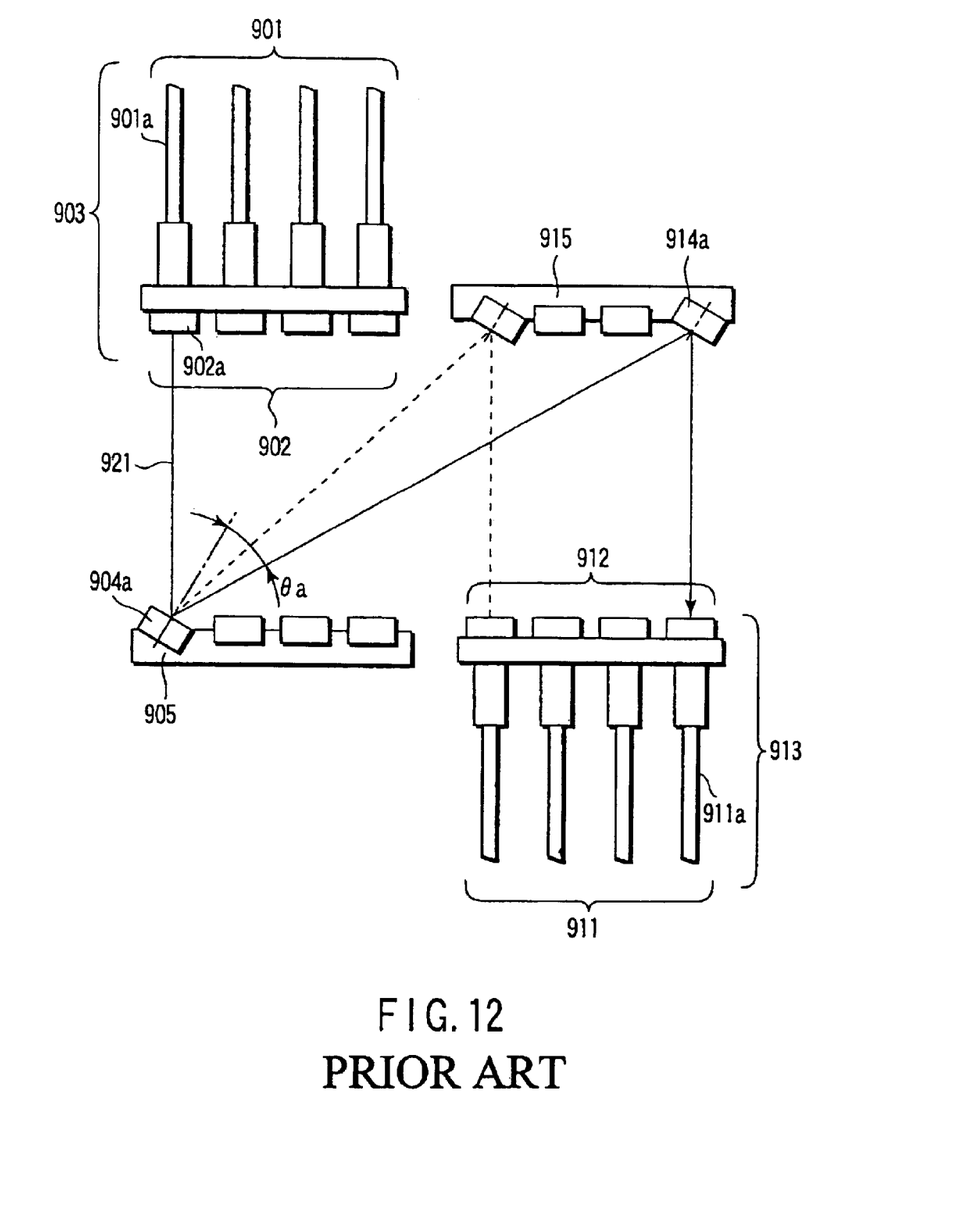
FIG. 12 shows an optical switch disclosed in EP 1 102 096 A2.

The optical switch has one set of a fiber lens array and a MEMS mirror array on an input side, and another set of a fiber lens array and a MEMS mirror array on an output side.

The fiber lens array 903 on the input side has an input fiber array 901 and an input lens array 902 corresponding thereto. The MEMS mirror array 905 has tilt variable mirrors 904a arranged like fibers 901a. The input fiber lens array 903 and the MEMS mirror array 905 are arranged to be opposed to each other, and the fibers 901a and the tilt variable mirrors 904a correspond to each other in a one-to-one relationship.

Likewise, the fiber lens array 913 on the output side has an output fiber array 911 and an output lens array 912 corresponding thereto. The MEMS mirror array 915 on the output side has tilt variable mirrors 914a arranged like the fibers 911a. The input fiber lens array 913 and the MEMS mirror array 915 are arranged to be opposed to each other, and the fibers 911a and the tilt variable mirrors 914a correspond to each other in a one-to-one relationship.

An exiting beam 921 projected from an input fiber 901a strikes the tilt variable mirror 904a opposed to the input fiber 901a, being converged by an input lens 902a. The tilt variable mirror 904a is allowed to be inclined about rotational axes. For example, as the variable tilt mirror 904a is inclined so that a reflection angle of the beam 921 is to be θa shown in the drawing, the beam 921 is reflected toward the tilt variable mirror 914a of the MEMS mirror array 915. The beam 921 is further reflected by the tilt variable mirror 914a to be directed to an output fiber 911a.

Therefore, by changing angles of the tilt variable mirrors 904a of the MEMS mirror array 905 on the input side and the tilt variable mirrors 914a of the MEMS mirror array 915 on the output side, an optical switch which can lead an optical signal from an arbitrary input fiber 901a to an arbitrary output fiber 911a can be realized.

BRIEF SUMMARY OF THE INVENTION

The present invention is directed to an optical switch, which appropriately optically connects optical fibers on an input side with optical fibers on an output side. The optical switch comprises an array unit on the input side, and an array unit on the output side. The array unit on the input side has an input side fiber array, a mirror array, and a direction adjustment mechanism. The input side fiber array has signal input optical fibers and at least one adjustment optical fiber. The mirror array has tilt variable mirrors to deflect signal light beams from the signal input optical fibers and at least one fixed mirror to reflect an adjustment light beam from the adjustment optical fiber. The direction adjustment mechanism adjusts a relative direction of the mirror array with respect to the input side fiber array. The array unit on the output side has an output side fiber array having signal output optical fibers.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments according to the present invention will now be described hereinafter with reference to the accompanying drawings.

First Embodiment

Figure 1:
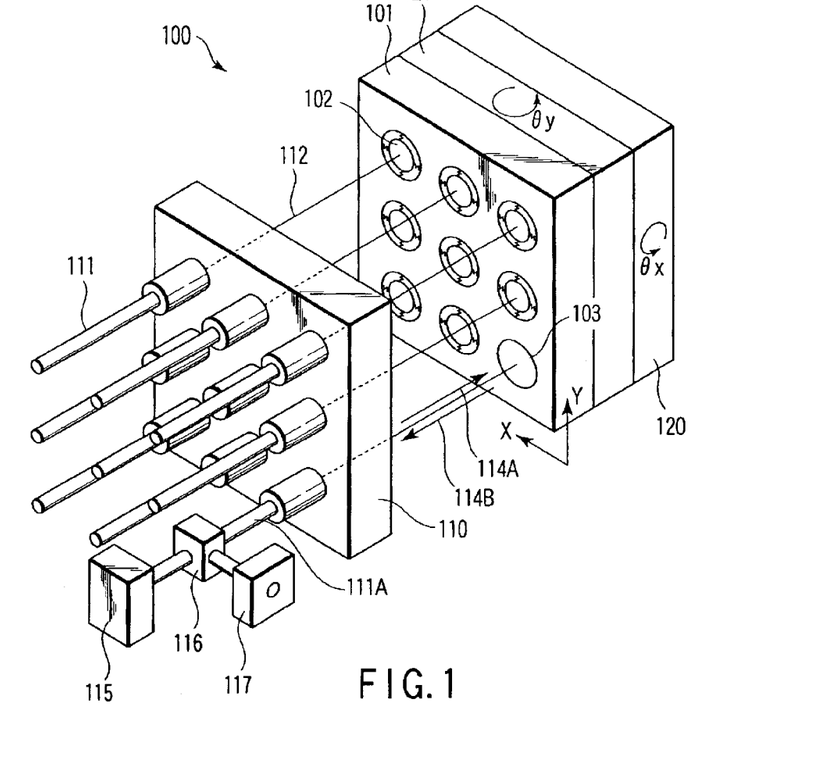
FIG. 1 is a perspective view showing an array unit according to a first embodiment, which constitutes a part of an optical switch of the present invention.

This embodiment aims at an array unit constituting a part of an optical switch. This embodiment provides an array unit, two of which array units can be combined to form an optical switch, for example. FIG. 1 shows the array unit according to this embodiment.

As shown in FIG. 1, the array unit 100 includes a fiber lens array 110, a mirror array 101, and a direction adjustment mechanism for adjusting a relative direction of the mirror array 101 with respect to the fiber lens array 110. The fiber lens array 110 has signal optical fibers 111 and at least one adjustment optical fiber 111A. The mirror array 101 has tilt variable mirrors 102 for deflecting signal light beams from the signal optical fibers and at least one fixed mirror 103 for reflecting an adjustment light beam from the adjustment optical fiber 111A.

The mirror array 101 comprises a micro electro mechanical system mirror array (MEMS mirror array), for example, which may be manufactured by the semiconductor micromachine technology.

The direction adjustment mechanism can adjust an inclination relative to an optical axis of the input side fiber lens array 110. In other words, the direction adjustment mechanism can adjust an angle about two axes orthogonal to an optical axis of the input side fiber lens array 110, i.e., an axis X and an axis Y. For example, the direction adjustment mechanism is constituted by a $\theta_x$ tilt mechanism 120 and a $\theta_y$ tilt mechanism 121, supports the MEMS mirror array 101 so as to be capable of being inclined in a direction $\theta_x$ (about the axis X) and a direction $\theta_y$ (about the axis Y).

As shown in FIG. 1, the direction adjustment mechanism may have a structure in which uniaxial inclination mechanisms like the $\theta_x$ tilt mechanism 120 or the $\theta_y$ tilt mechanism 121 are superimposed as well as a inclination mechanism by which inclinations along two axes can be simultaneously performed.

The two array units 100 are arranged as shown in FIG. 12 to constitute the optical switch. In the optical switch having such a structure, the signal optical fibers 111 of the array unit 100 positioned on the input side function as signal input optical fibers for receiving signal light beams, and the signal optical fibers 111 of the array unit 100 positioned on the output side server as signal output optical fibers for outputting the signal light beams.

Details of the MEMS mirror array 101 will now be described hereinafter with reference to FIGS. 3 and 4, and then the fiber lens array 110 will be explained.

Figure 3:
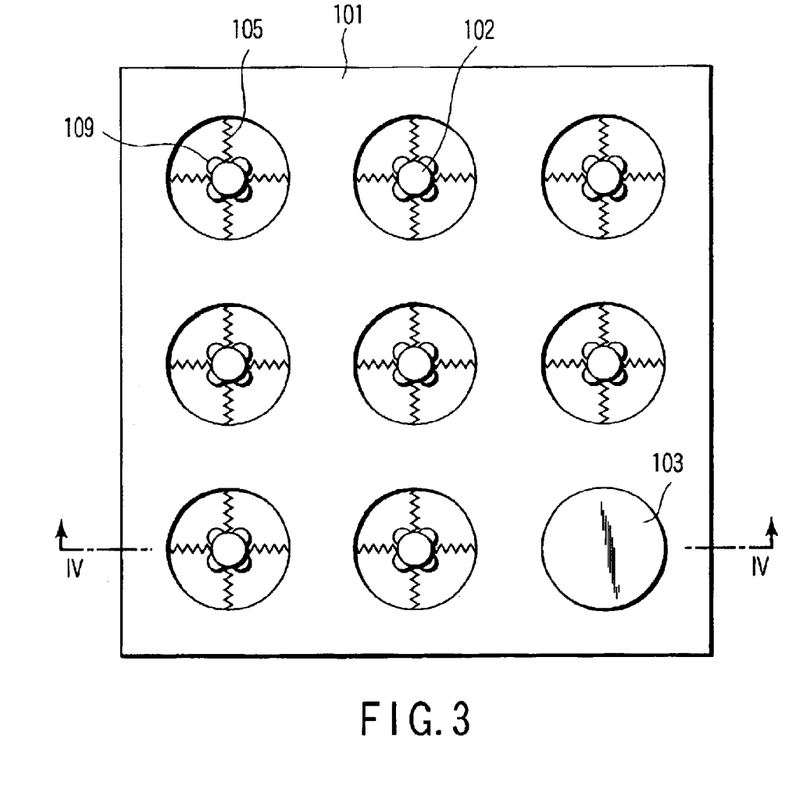
FIG. 3 is a plane view showing a MEMS mirror array illustrated in FIG. 1.
Figure 4:
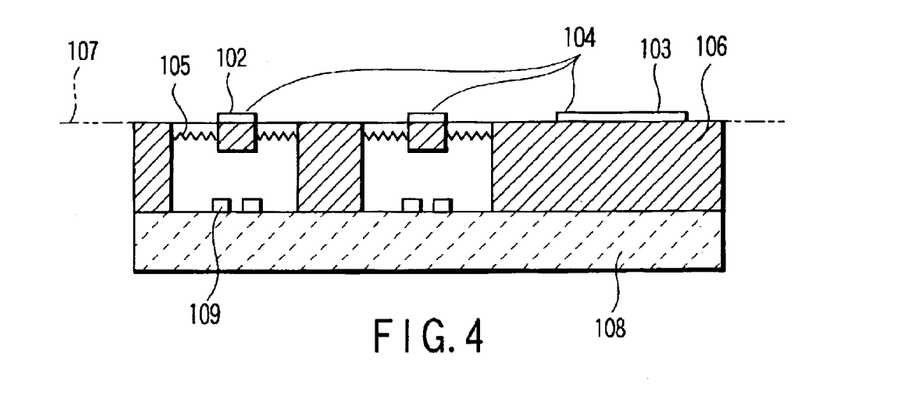
FIG. 4 is a side cross-sectional view showing the MEMS mirror array depicted in FIG. 3 taken along the line IV—IV.

As shown in FIGS. 3 and 4, the MEMS mirror array 101 has eight tilt variable mirrors 102 and one fixed mirror 103. The tilt variable mirrors 102 and the fixed mirror 103 are aligned in a matrix with 3 rows×3 columns.

In this embodiment, although the MEMS mirror array 101 has the eight tilt variable mirrors 102, the number of tilt variable mirrors 102 is just an example, it is not restricted to eight, and any other number may be used. Furthermore, the number of the fixed mirror 103 is not restricted to one. That is, it is good enough for the MEMS mirror array 101 to have at least one fixed mirror 103. Moreover, the position of the fixed mirror 103 is not restricted to one illustrated in FIG. 3. That is, the fixed mirror 103 may be placed anywhere on the matrix with three rows and three columns. Additionally, the matrix is not restricted to three rows and three columns, but it is possible to adopt an arbitrary matrix with n rows and m columns (n and m are both natural numbers).

Coating capable of reflecting the optical signal used in the optical communication system is applied to the tilt variable mirrors 102 and the fixed mirror 103, and this coating forms a reflection coat surface 104 (see FIG. 4). A material of the reflection coat surface 104 includes, e.g., Au or Al, and a coating method includes, e.g., vacuum deposition or sputtering. Further, the reflection coat surface 104 has a sufficiently large area as compared with a beam waist of a signal light beam 112 or an adjustment light beam 114A, which will be described later.

Figure 5:
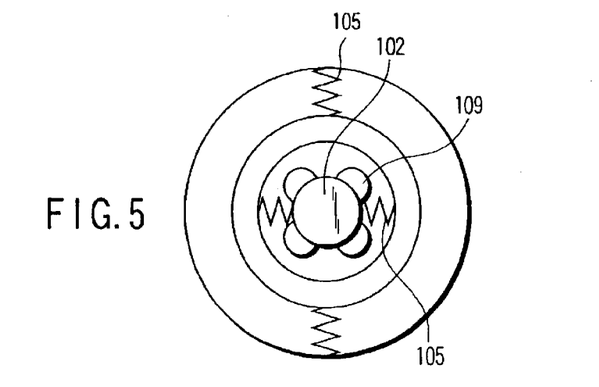
FIG. 5 is a plane view of another tilt variable mirror, which can be applied in place of a tilt variable mirror of the MEMS mirror array depicted in FIG. 3.

As shown in FIGS. 3 and 4, the tilt variable mirrors 102 are held to be capable of tilting about one axis or two axes by springs 105. Alternatively, as shown in FIG. 5, the tilt variable mirrors 102 may be held by a gimbal structure to be capable of tilting, for example.

The tilt variable mirrors 102, the fixed mirror 103 and the springs 105 are manufactured from the same mirror substrate 106. Therefore, the reflection coat surface 104 of each tilt variable mirror 102 and the reflection coat surface 104 of the fixed mirror 103 are placed on the same surface 107. A material of the mirror substrate 106 comprises, e.g., a monocrystal silicon substrate (wafer). In this case, since the surface precision of the flatness and the like of the surface 107 is dependent on manufacturing steps of the wafer, the surface 107 can be fully used as an optical reflection surface. Furthermore, as production of the tilt variable mirrors 102 and the spring 105, the processing using, e.g., anisotropic etching can be applied.

Moreover, an electrode substrate 108 is bonded on the lower side of the mirror substrate 106, and electrodes 109 are provided on the surface of the electrode substrate 108, which is opposed to the tilt variable mirrors 102.

Figure 2:
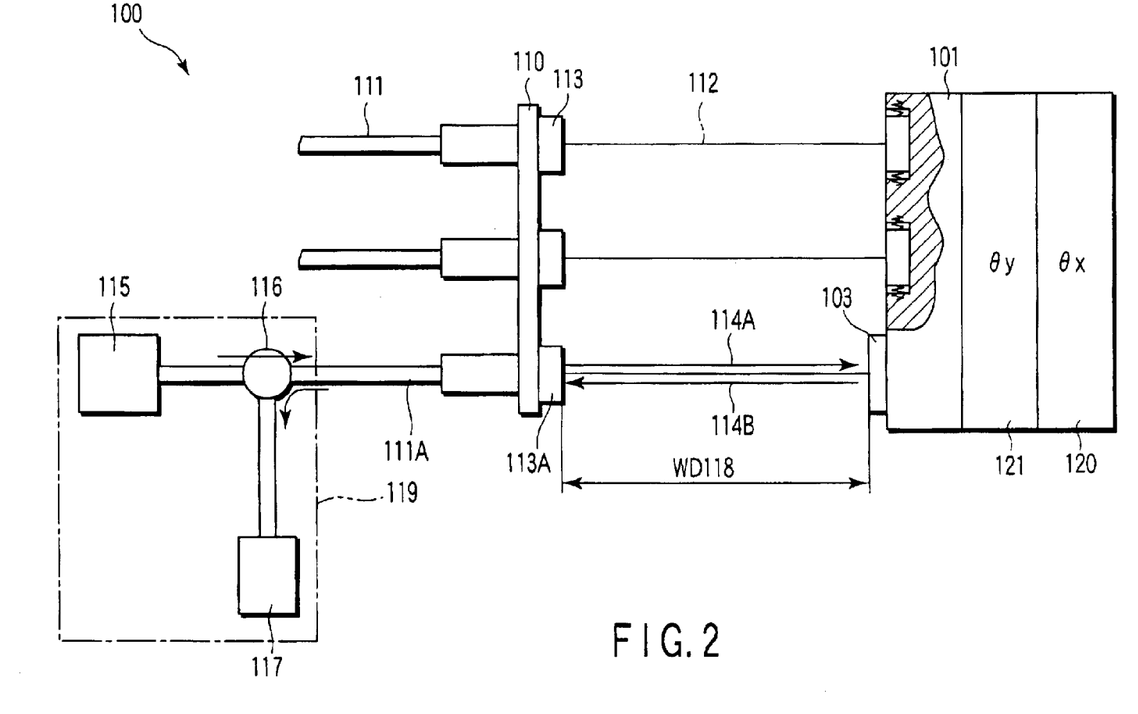
FIG. 2 is a side view showing the array unit illustrated in FIG. 1.

As shown in FIGS. 1 and 2, the fiber lens array 110 has eight signal optical fibers 111 and one adjustment optical fiber 111A, and these optical fibers are aligned in a matrix with three rows and three columns. The arrangement pitch of the optical fibers 111 and 111A of the fiber lens array 110 is the same as the arrangement pitch of the tilt variable mirrors 102 of the MEMS mirror array 101.

The number of the optical fibers 111 and 111A of the fiber lens array 110 is just an example like the MEMS mirror array 101, the present invention is not restricted to such a number, and any other arbitrary number may be adopted. Additionally, this can be also applied to the matrix, the present invention is not restricted to the matrix with three rows and three columns, and an arbitrary matrix with n rows and m columns (n and m are both natural numbers).

As shown in FIG. 2, the fiber lens array 110 further has lenses 113 and 113A for converging the signal light beam and the adjustment light beam projected from the signal optical fibers 111 and the adjustment optical fiber 111A. The lenses 113 and 113A correspond to the optical fibers 111 and 111A in the one-to-one relationship.

As shown in FIG. 1, the MEMS mirror array 101 and the fiber lens array 110 are arranged so as to be opposed to each other, the tilt variable mirrors 102 and the signal fibers correspond to each other in the one-to-one relationship, and the fixed mirror 103 and the adjustment optical fiber 111A also correspond to each other in the one-to-one relationship.

The MEMS mirror array 101 and the fiber lens array 110 are positioned so that the signal light beams projected from the signal fibers 111 strike the tilt variable mirrors 102 and the adjustment light beam projected from the adjustment optical fiber 111A strike the fixed mirror 103.

A distance WD 118 between the MEMS mirror array 101 and the fiber lens array 110 is determined in accordance with the lenses 113, and the lenses 113 are designed to converge the signal light beams 112 and the adjustment light beam on the reflecting surfaces of the tilt variable mirrors 102 and the fixed mirror 103.

As shown in FIGS. 1 and 2, the fiber lens array 110 further includes a light source for emitting the adjustment light and a photo detector 117 for detecting the adjustment light. The photo detector 117 is constituted by, e.g., a power meter capable of measuring a quantity of light. Both the light source 115 and the power meter 117 are optically connected to the adjustment optical fiber 111A through a directional coupler 116.

The adjustment light emitted from the light source 115 is caused to travel from the adjustment optical fiber 111A toward the fixed mirror 103 of the MEMS mirror array 101 as the adjustment light beam. The adjustment light beam reflected by the fixed mirror 103 enters the adjustment optical fiber 111A. The directional coupler 116 selectively separates the adjustment light returned from the fixed mirror 103 from the adjustment light directed toward the fixed mirror 103 from the light source 115, and leads it to the power meter 117. The power meter 117 measures a light quantity of the adjustment light that has been reflected by the fixed mirror 103 entering adjustment optical fiber 111A.

The effect of this embodiment will now be described hereinafter.

The inclination caused due to a processing stress of the tilt variable mirrors 102 or the springs 105, which is observed in the tilt variable mirrors 102, is not generated in the fixed mirror 103 of the MEMS mirror array 101. Further, since the fixed mirror 103, which is constituted by a part of the mirror substrate 106, has the rigidity higher than that of the tilt variable mirrors 102, the distortion due to the stress of the reflection coat surface 104, which is observed in the tilt variable mirrors 102, is not generated in the fixed mirror 103. Furthermore, as compared with the tilt variable mirrors 102 held by the fine springs 105, the fixed mirror 103 is held in the stable state. Therefore, the fixed mirror 103 can be a reference surface suitable for adjustment/confirmation of the inclination in setting of the MEMS mirror array 101 in place of the tilt variable mirrors 102.

The adjustment light 114A emitted from the light source 115 travels toward the lens 113A side in the fiber 111A by the directional coupler 116, and is caused to travel from the end of the fiber 111A. The adjustment light beam 114A projected from the fiber 111A strikes the fixed mirror 103, being converged by the lens 113A. The adjustment light beam 114A is then reflected by the fixed mirror 103 to strike the fiber lens array 110, which is arranged so as to be opposed to the MEMS mirror array 101.

As the fixed mirror 103 is vertically arranged with respect to the adjustment light beam 114A, the adjustment light beam 114B reflected by the fixed mirror 103 strikes the lens 113A to enter the fiber 111A. However, as the fixed mirror 103 is inclined, the adjustment light beam 114B strikes a position shifted in accordance with the inclination.

The inclinations $\theta_x$ and $\theta_y$ of the MEMS mirror array 101 are adjusted by using the $\theta_x$ tilt mechanism 120 and the $\theta_y$ tilt mechanism 121 while visually confirming this tilt so that the adjustment light beam 114B strikes the lens 113A. If the adjustment light beam 114 is a visible light beam, it can be visually confirmed as it is. However, if the adjustment light beam 114 is a non-visible light beam, it is good enough to visualize that beam by utilizing a luminescent target, a visualization goggle, a CCD camera or a pickup tube, and $\theta_x$ and $\theta_y$ can be adjusted as in the case of using the visible light beam.

Because of the above-described visual adjustment, the adjustment light beam 114B reflected by the fixed mirror 103 is converted by the lens 113A, and again returned to the adjustment optical fiber 111A. This adjustment light beam 114B is led to the power meter 117 by the directional coupler 116. The tilts $\theta_x$ and $\theta_y$ of the MEMS mirror array 101 are adjusted by using the $\theta_x$ tilt mechanism 120 and the $\theta_y$ tilt mechanism 121 in such a manner that a light quantity of the adjustment light beam 114B indicated by the power meter 117 becomes maximum. Since the fixed mirror 103 is vertically arranged with respect to the adjustment light beam 114 by this adjustment, the MEMS mirror array 101 attached to the fixed mirror 103 is also arranged vertically, i.e., arranged without a tilt with respect to the adjustment light beam 114.

This embodiment can realize the optical switch that can assuredly switch the signal light without an insufficient stroke of the displacement angle of the tilt variable mirrors 102.

Various kinds of changes or modifications may be added to each structure of this embodiment. For example, each of the light source 115, the directional coupler 116 and the power meter 117 may be substituted by a commercially available attenuation measuring instrument 119 (see FIG. 2).

Moreover, the $\theta_x$ tilt mechanism 120 and the $\theta_y$ tilt mechanism 121 may be provided on the fiber lens array 110 side rather than the MEMS mirror array 101 side so as to be capable of adjusting $\theta_x$ and $\theta_y$ of the fiber lens array 110. The MEMS mirror array 101 may be arranged vertically, i.e., arranged without a tilt with respect to the adjustment light beam by adjusting the direction of the fiber lens array 110 with the MEMS mirror array 101 being used as a reference.

As described at the beginning, the optical switch can be constituted by combining the two array units 100 according to this embodiment. However, the optical switch according to this embodiment does not necessarily have to include the two array units 100, it may include only one array unit 100. The array unit 100 according to this embodiment is particularly preferable as the array unit on the input side. Therefore, in the preferable optical switch according to this embodiment, the array unit on the input side being constituted by the array unit 100 can suffice, and the array unit on the output side may have another structure.

That is, the optical switch according to this embodiment may have the array unit 100 conforming to this embodiment as the array unit on the output side, but it does not necessary have to have this structure. For example, it may have a structure that the fixed mirror 103, the adjustment optical fiber 111A, the light source 115, the directional coupler 116 and the power meter 117 are eliminated from the array unit 100. Further, the MEMS mirror array 101 may be substituted by the fixed mirror.

Second Embodiment

This embodiment aims at the array unit constituting a part of the optical switch like the first embodiment. The array unit according to this embodiment will now be described with reference to FIGS. 6 to 8. In these drawings, like reference numerals denote members equivalent to those in the first embodiment, and their detailed explanation will be eliminated. Description will be given hereinafter placing emphasis on different points from the first embodiment.

Figure 6:
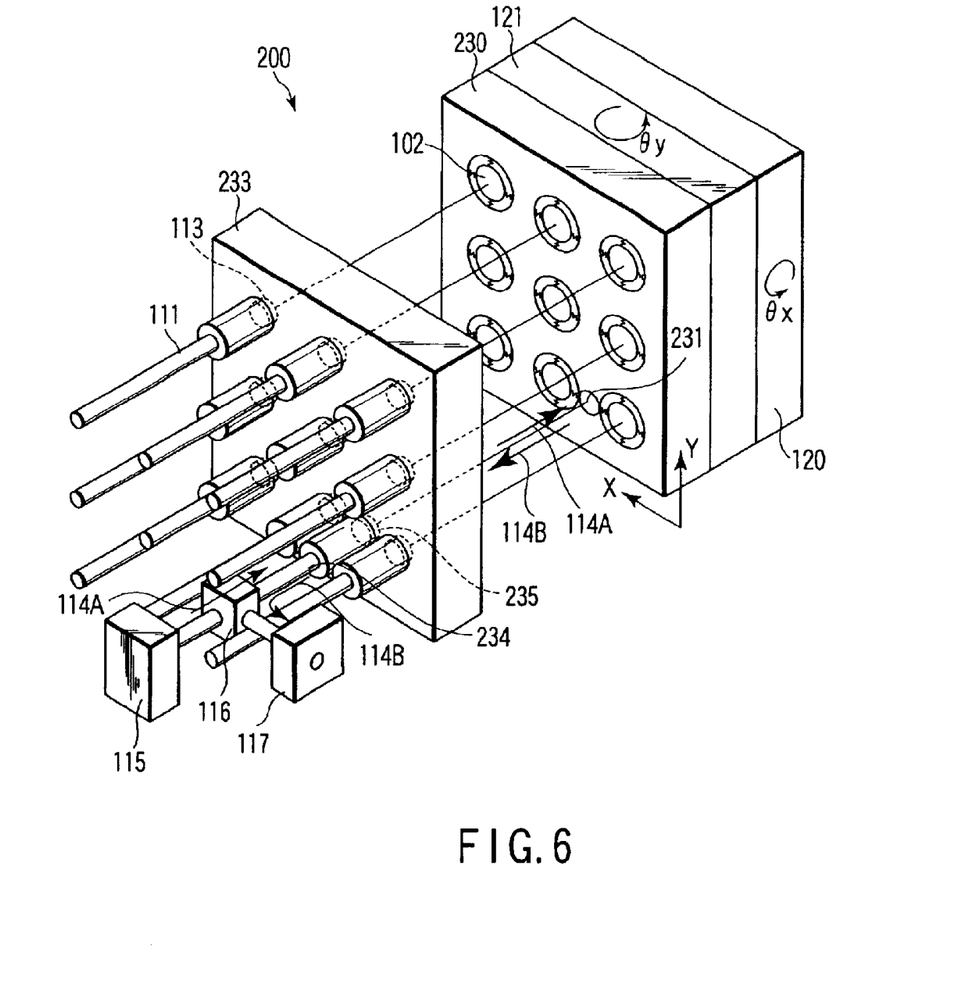
FIG. 6 is a perspective view showing an array unit according to a second embodiment, which constitutes a part of the optical switch of the present invention.

As shown in FIG. 6, an array unit 200 according to this embodiment includes a fiber lens array 233, a mirror array 230, and a direction adjustment mechanism for adjusting a direction of the mirror array 230 relative to the fiber lens array 233. The fiber lens array 233 has signal optical fibers 111, and at least one adjustment optical fiber 234. The mirror array 230 has tilt variable mirrors 102 for deflecting signal light beams from the signal optical fibers 111 and at least one fixed mirror 231 for reflecting an adjustment light beam from the adjustment optical fiber 234.

The direction adjustment mechanism is constituted by a $\theta_x$ tilt mechanism 120 and a $\theta_y$ tilt mechanism 121 like the first embodiment.

Figure 7:
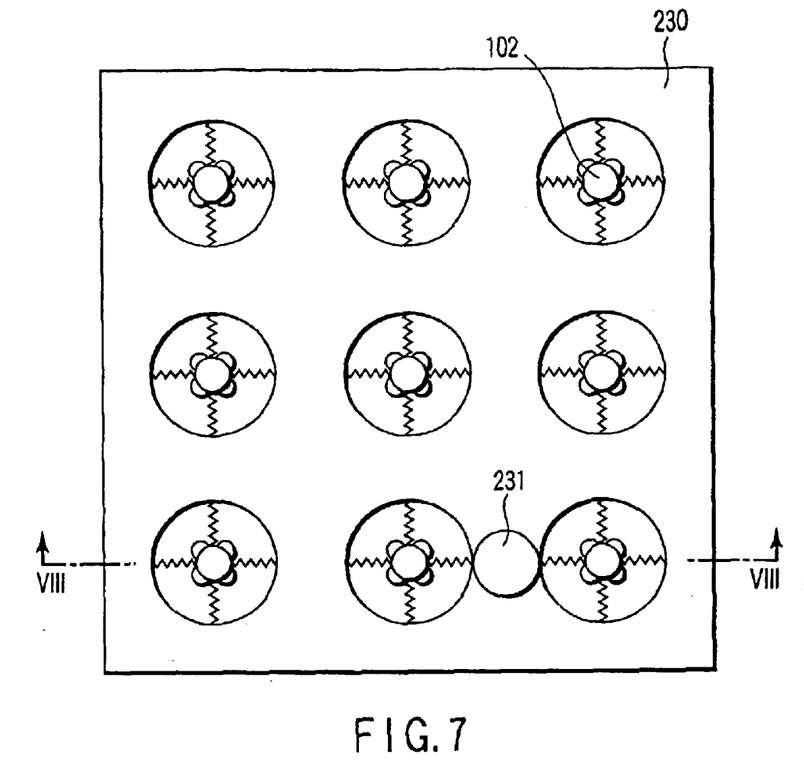
FIG. 7 is a plane view showing a MEMS mirror array depicted in FIG. 6.

As shown n FIGS. 6 and 7, the MEMS mirror array 230 has nine tilt variable mirrors 102 and one fixed mirror 231. The tilt variable mirrors 102 are aligned in the matrix with three rows and three columns. The fixed mirror 231 is placed at outer peripheral portions of appropriate tilt variable mirrors 102. In other words, it is positioned between appropriate two tilt variable mirrors 102. That is, the fixed mirror 231 is off the matrix with three rows an three columns.

The number of the tilt variable mirrors 102 of the MEMS mirror array 230 is just an example, and it is not restricted to nine, and any other number maybe adopted. Furthermore, the number f the fixed mirror 231 is not restricted to one, and it is good enough that the MEMS mirror array 230 has at least one fixed mirror 231. Moreover, the arrangement of the tilt variable mirrors 102 is not restricted to three rows and three columns, and an arbitrary matrix with n rows and m columns (n and m are both natural numbers) may be used.

Figure 8:
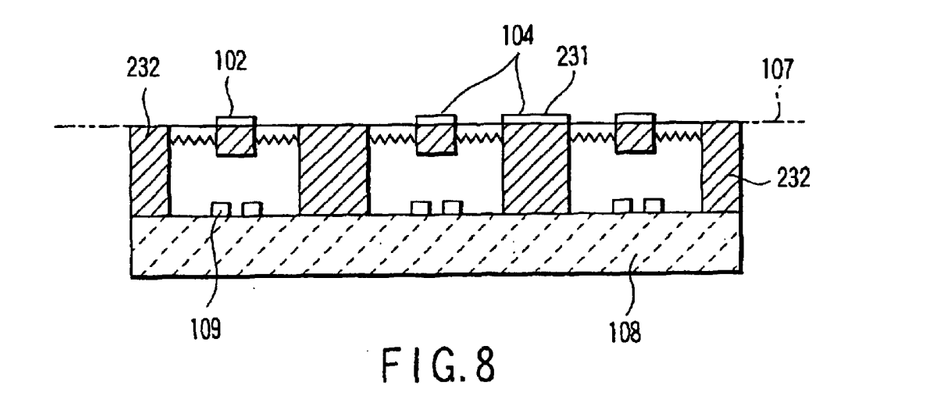
FIG. 8 is a side cross-sectional view showing the MEMS mirror array illustrated in FIG. 7 taken along the line VIII—VIII.

As shown in FIG. 8, the tilt variable mirrors 102 and the fixed mirror 231 are manufactured from the same mirror substrate 232. Therefore, a reflection coat surface 104 of each tilt variable mirror 10 and a reflection coat surface 104 of the fixed mirror 231 are positioned on the same surface 107.

As shown in FIG. 6, the fiber lens array 233 has nine signal optical fibers 111 and one adjustment optical fiber 234. The nine signal optical fibers 111 are aligned in the matrix with three rows and three columns like the tilt variable mirrors 102. The arrangement pitch of the optical fibers 111 of the fiber lens array 233 is the same as the arrangement pitch of the tilt variable mirrors 102 of the MEMS mirror array 230.

On the other hand, the adjustment optical fiber 234 is positioned at the outer peripheral portions of appropriate signal optical fibers. In other words, it is placed between appropriate two signal optical fibers 111. That is, the adjustment optical fiber 234 is off the matrix with three rows and three columns.

Since the tilt variable mirror 102 is a larger structure than the optical fiber 111 or 234, the arrangement pitch of the tilt variable mirrors 102 or the optical fibers 111 is determined based on a dimension of each tilt variable mirror 102. It is, therefore, fully possible to arrange the adjustment optical fiber 234 between the two signal optical fibers 111 each of which is a relatively small structure.

In FIG. 6, although the adjustment optical fiber 234 is arranged between two signal optical fibers 111, it may be arranged between four signal optical fibers 111, namely, at an intermediate position of these fibers for arrangement with the narrower pitch.

The number of the signal optical fibers 111 of the fiber lens array 233 is just an example, and it is not restricted to nine, and any other number may be adopted. Additionally, the number of the adjustment optical fibers 234 is not restricted to one. That is, it is good enough for the fiber lens array 233 to have at least one adjustment optical fiber 234. Further, the arrangement of the signal optical fibers 111 is not restricted to three rows and three columns, and an arbitrary arrangement of n rows and m columns (n and m are both natural numbers) may be used.

The fiber lens array 233 further has lenses 113 positioned at the front parts of the signal optical fibers 111 and a lens 235 positioned at the front part of the adjustment optical fiber 234. The lenses 113 and the signal optical fibers 111 correspond to each other in the one-to-one relationship, and the lens 235 and the adjustment optical fibers 234 correspond to each other in the one-to-one relationship.

The fiber lens array 233 further has a light source 115, a directional coupler 116 and a power meter, which are optically connected to the adjustment fiber 234 like the first embodiment.

The MEMS mirror array 230 and the fiber lens array 233 are set so as to be opposed to each other, the tilt variable mirrors 102 and the signal fibers 111 correspond to each other in the one-to-one relationship, and the fixed mirror 231 and the adjustment optical fiber 234 also correspond to each other in the one-to-one relationship.

The effect of this embodiment will now be described hereinafter.

An adjustment light beam 114A generated by the light source 115 is caused to travel toward the lens 235 in the adjustment optical fiber 234 by the directional coupler 116, and outgoes from the end of the adjustment optical fiber 234. The adjustment optical beam 114A projected from the adjustment optical fiber 234 strikes the fixed mirror 231, being converged by the lens 235. The adjustment light beam 114A is reflected by the fixed mirror 231 to strike the fiber lens array 233 arranged so as to be opposed to the MEMS mirror array 230.

As the fixed mirror 231 is vertically arranged with respect to the adjustment light beam 114, the adjustment light beam 114B reflected by the fixed mirror 231 strikes the lens 235 to enter the fiber 234. However, as the fixed mirror 231 is inclined, the adjustment light beam 114B strikes a position shifted according to the inclination.

The tilts $\theta_x$ and $\theta_y$ of the MEMS mirror array 230 are adjusted by using the $\theta_x$ tilt mechanism 120 and the $\theta_y$ tilt mechanism 121 while visually confirming this shift so that the adjustment light beam 114B strikes the lens 235.

Because of the above-described visual adjustment, the adjustment light beam 114B reflected by the fixed mirror 231 is converged by the lens 235 and returned to the adjustment optical fiber 234. The adjustment light beam 114B is led to the power meter 117 by the directional coupler 116. The tilts $\theta_x$ and $\theta_y$ of the MEMS mirror array 230 are adjusted by using the $\theta_x$ tilt mechanism 120 and the $\theta_y$ tilt mechanism 121 in such a manner that a light quantity of the adjustment light beam 114B indicated by the power meter 117 becomes maximum. Since the fixed mirror 231 is vertically arranged with respect to the adjustment light beam 114 by this adjustment, the MEMS mirror array 230 attached to the fixed mirror 231 is also arranged vertically with respect to the adjustment light beam 114, i.e., without inclination.

With this structure, this embodiment can realize the optical switch that can assuredly switch the signal light without an insufficient stroke of the displacement angle of the tilt variable mirrors 102, as in the first embodiment. Further, since the number of channels that can be used for switching in this embodiment is larger than that in the first embodiment by one, the present embodiment can provide the optical switch with a higher degree of integration.

Third Embodiment

This embodiment aims at the array unit constituting a part of the optical switch like the first embodiment. The array unit according to this embodiment will now be described with reference to FIGS. 9 to 11. In these drawings, like reference numerals denote members equivalent to those in the first embodiment or the second embodiment, and their detailed explanation will be eliminated. Description will be given hereinafter placing emphasis on different points from the first embodiment or the second embodiment.

Figure 9:
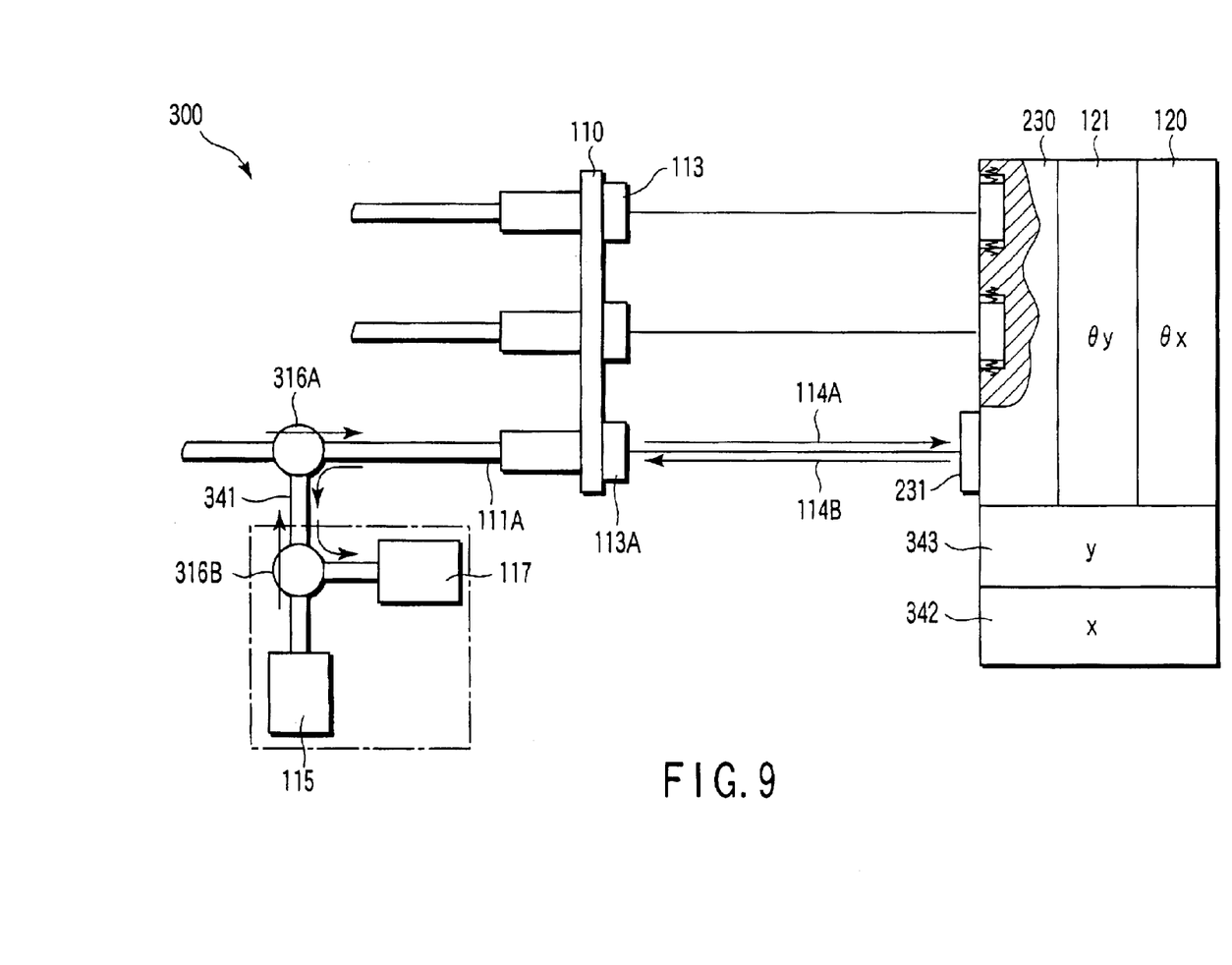
FIG. 9 is a side view showing an array unit according to a third embodiment, which constitutes a part of the optical switch of the present invention.
Figure 10:
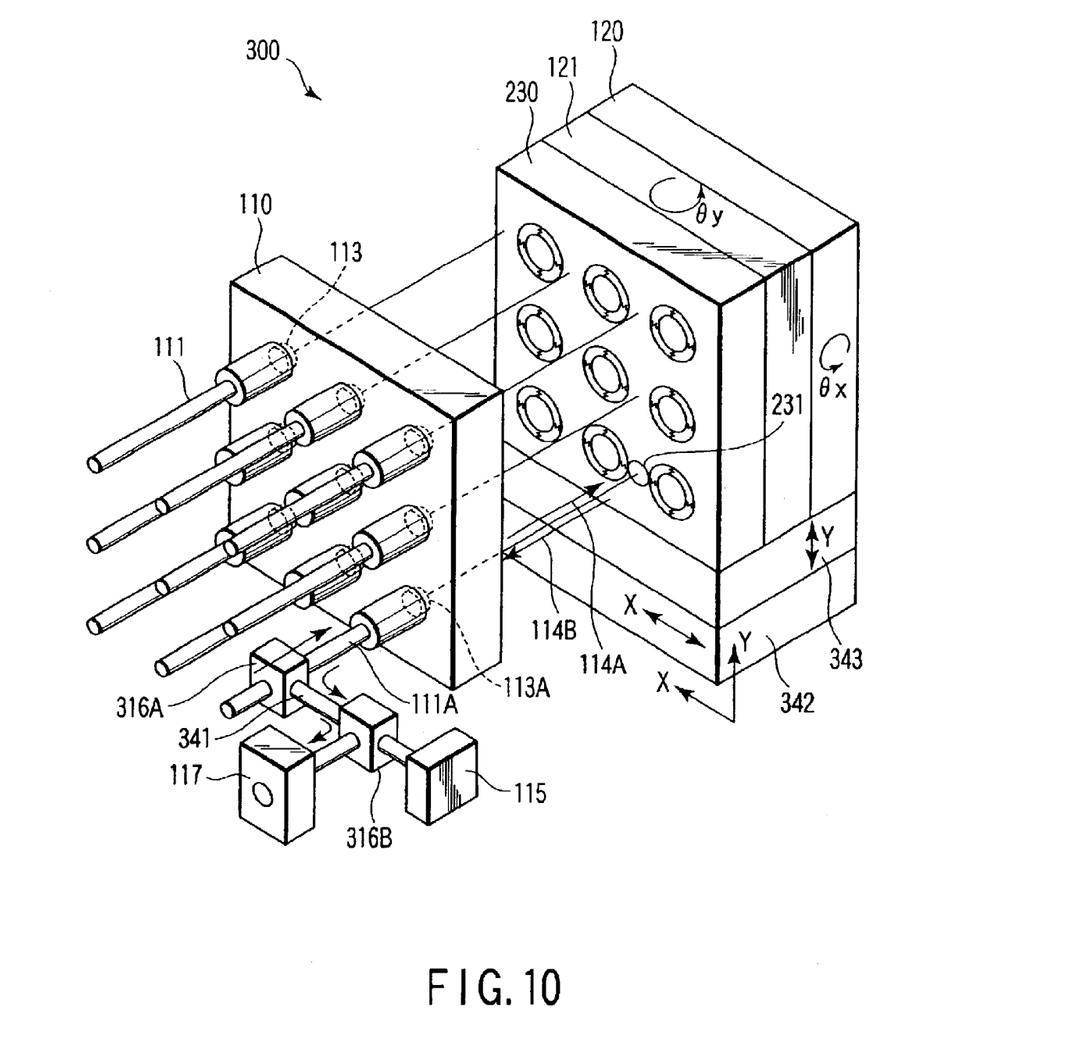
FIG. 10 is a perspective view of the array unit depicted in FIG. 9, in which the state of adjustment of a direction of the MEMS mirror array is illustrated.
Figure 11:
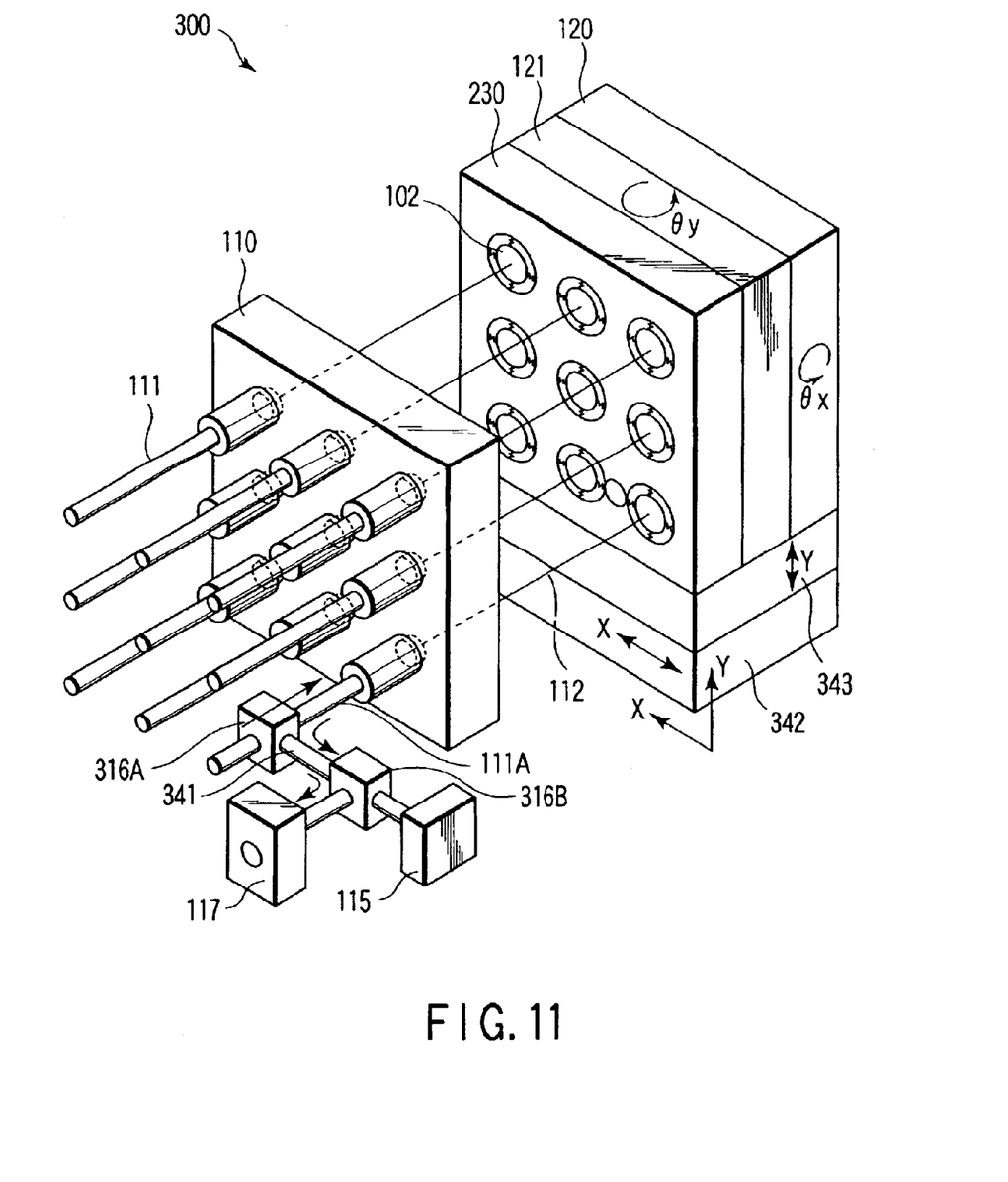
FIG. 11 is a perspective view of the array unit depicted in FIG. 9, in which the state of signal optical transmission is illustrated.

As shown in FIGS. 9 to 11, an array unit 300 according to this embodiment includes a fiber lens array 110, a mirror array 230, a direction adjustment mechanism for adjusting a direction of the mirror array 230 relative to the fiber lens array 110, and a positional adjustment mechanism for adjusting a relative position between the fiber lens array 110 and the mirror array 230 in a direction crossing an optical axis of the fiber lens array 110. The fiber lens array 110 has signal optical fibers 111 and at least one adjustment optical fiber 111A. The mirror array 230 has tilt variable mirrors 102 for deflecting signal light beams from the signal optical fibers 111 and at least one fixed mirror 231 for reflecting an adjustment light beam from the adjustment optical fiber 111A.

The fiber lens array according to this embodiment is equivalent to the fiber lens array 110 according to the first embodiment, and the mirror array according to this embodiment is equivalent to the mirror array 230 according to the second embodiment.

The direction adjustment mechanism is constituted by a $\theta_x$ tilt mechanism 120 and a $\theta_y$ tilt mechanism 121 like the first embodiment. Further, the positional adjustment mechanism is constituted by, e.g., an x shift mechanism 342 and a y shift mechanism 343 and supports the MEMS mirror array 230 to be capable of moving in a direction X and a direction Y (along an axis X and an axis Y).

The fiber lens array 110 further has lenses 113 positioned at the front parts of the signal optical fibers 111, and a lens 113A positioned at the front part of the adjustment optical fiber 111A. The lenses 113 and the signal optical fibers 111 correspond to each other in the one-to-one relationship, and the lens 113A and the adjustment optical fiber 111A correspond to each other in the one-to-one relationship.

Furthermore, the fiber lens array 110 has a light source 115 and a power meter 117, and the light source 115, and the power meter 117 are both optically connected with the adjustment optical fiber 111A through a branch fiber 341 and a directional coupler 316B.

That is, the directional coupler 316A is connected to the adjustment optical fiber 111A. The other directional coupler 316B is connected to the branch fiber 341 branched by the directional coupler 316A, the light source 115 is connected to one end of the fiber branched by the directional coupler 316B, and the power meter 117 is connected to the other end of the same.

The directional coupler 316A directs the adjustment light beam from the light source 115 toward the fixed mirror 231, and directs the adjustment light returning from the fixed mirror 231 toward the directional coupler 316B. Moreover, the directional coupler 316B selectively separates the adjustment light returning from the fixed mirror 231 from the adjustment light advancing from the light source 115 toward the directional coupler 316A, and leads it toward the power meter 117.

The effect of this embodiment will now be described hereinafter.

The adjustment light beam 114A generated by the light source 115 is caused to travel toward the lens 113A side in the adjustment optical fiber by the directional couplers 316A and 316B, and outgoes from the end of the adjustment optical fiber 111A. An irradiation position of the adjustment light beam 114 is unknown when the position of the MEMS mirror array 230 in the direction XY is unadjusted.

In this embodiment, the adjustment optical fiber 111A is utilized not only for relative direction adjustment between the fiber lens array 110 and the MEMS mirror array 230, but it is also used as one channel for signal optical transmission.

In case of adjusting a relative direction between the fiber lens array 110 and the MEMS mirror array 230, as shown in FIG. 10, the XY shift position of the MEMS mirror array 230 is adjusted by using the x shift mechanism 342 and the y shift mechanism 343 while performing visual confirmation so that the adjustment optical beam 114A strikes the fixed mirror 231 of the MEMS mirror array 230.

The method of XY shift position adjustment of the MEMS mirror array 230 is not restricted to visual confirmation, and it may be carried out by manually or automatically moving the MEMS mirror array 230 by an amount according to a stipulated value.

After enabling the adjustment light beam 114A to strike the fixed mirror 231 by the XY shift position adjustment of the MEMS mirror array 230, the direction of the MEMS mirror array 230, namely, the tilts $\theta_x$ and $\theta_y$ about the axis X and the axis Y are adjusted as in the first embodiment or the second embodiment, i.e., by using the $\theta_x$ tilt mechanism 120 and the $\theta_y$ tilt mechanism 121 so that the light quantity of the adjustment light beam 114B indicated by the power meter 117 becomes maximum. Since the fixed mirror 231 is vertically adjusted with respect to the adjustment light beam 114 by this adjustment, the MEMS mirror array 230 attached to the fixed mirror 231 is also vertically arranged with respect to the adjustment light beam 114, i.e., without the inclination.

Further, when using as the optical switch after the adjustment, the XY shift position of the MEMS mirror array 230 is adjusted by using the x shift mechanism 342 and the y shift mechanism 343 while performing visual confirmation so that the adjustment light beam 114A strikes the tilt variable mirror 102 at a position corresponding to the adjustment optical fiber 111A, as shown in FIG. 11.

Because of this adjustment, all the optical fibers 111 and 111A of the fiber lens array 110 are arranged to be opposed to the tilt variable mirrors 102 of the MEMS mirror array 230. That is, all the optical fibers 111 and 111A of the fiber lens array 110 respectively correspond to the tilt variable mirrors 102 in the one-to-one relationship.

The signal light passing through the adjustment optical fiber 111A passes through the direction coupler 316A and outgoes from the end surface of directional coupler 316A toward the corresponding tilt variable mirror 102 as a signal light beam 112. In other words, the directional coupler 316A is designed to transmit the signal light therethrough as it is.

As apparent from this explanation, this embodiment can realize the optical switch that can assuredly switch the signal light without an insufficient stroke of the displacement angle of the tilt variable mirrors 102. Moreover, the number of channels that can be used for switching in this embodiment is larger than that in the first embodiment by one, the present embodiment can provide the optical switch with a higher degree of integration. Additionally, as compared with the second embodiment, since the optical fiber 234, which is not used as a channel, and the lens 235 for this fiber do not have to be provided, it is possible to further inexpensively provide the optical switch having the same number of channels.

In this embodiment, although the relative positional adjustment of the fiber lens array 110 and the mirror array 230 in the direction crossing the optical axis of the fiber lens array 110 is carried out by actually moving the MEMS mirror array 230, it may be carried out by moving the fiber lens array 110 in place of the MEMS mirror array 230.

That is, the x shift mechanism 342 and the y shift mechanism 343 may be provided on the fiber lens array 110 side in place of providing the x shift mechanism 342 and the y shift mechanism 343 on the MEMS mirror array 230 side. Of course, one of the x shift mechanism 342 and the y shift mechanism 343 may be provided on the MEMS mirror array 230 side and the other one may be provided on the fiber lens array 110 side.

Further, the optical fiber 111A can be used as the optical fiber on the output side as well as the optical fiber on the input side by separating the directional coupler 316A from the optical fiber 111A and connecting the optical fiber 111A by using a non-illustrated optical fiber connecter after completion of setting of the MEMS mirror array in this embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optical switch, which appropriately optically connects optical fibers on an input side with optical fibers on an output side, comprising:

an array unit on the input side; and an array unit on the output side, the array unit on the input side having: an input side fiber array having signal input optical fibers aligned in a matrix with m rows and n columns (m and n are both natural numbers), at least one of the signal input optical fibers also serving as an adjustment optical fiber; a mirror array having tilt variable mirrors to deflect signal light beams from the signal input optical fibers and at east one fixed mirror to reflect an adjustment light beam from the adjustment optical fiber, tilt variable mirrors being aligned in the matrix with m rows and n columns, and the fixed mirror being off the matrix within rows and n columns; a direction adjustment mechanism to adjust a relative direction of the mirror array with respect to the input side fiber array; and positional adjustment mechanism to adjust a relative position of the input side fiber array and the mirror array in a direction crossing an optical axis of the input side fiber array, such that the signal input optical fiber serving as the adjustment optical fiber being positioned so as to face the fixed mirror by the positional adjustment mechanism, the direction of the mirror array is adjusted by the direction adjustment mechanism, and then the signal input optical fibers are positioned so as to respectively face the tilt variable mirrors by the positional adjustment mechanism, the array unit on the output side having an output side fiber array having signal output optical fibers.

2. The optical switch according to claim 1, wherein the direction adjustment mechanism is able to adjusting an angle about two axes orthogonal to the optical axis of the input side fiber array.

3. The optical switch according to claim 1, wherein the tilt variable mirrors and the fixed mirror are formed from a same mirror substrate, so that reflection coat surfaces of the tilt variable mirrors and fixed mirror are on a same plane.

4. The optical switch according to claim 1, wherein the array unit on the output side further has other mirror array having tilt variable mirrors to deflect the signal light beams from the mirror array of the input side fiber array toward the output side fiber array.

5. The optical switch according to claim 1, wherein the array unit on the output side further has fixed mirror that reflects the signal light beams from the mirror array of the input side fiber array toward the output side fiber array.

* * * * *

UNITED STATES PATENT AND TRADEMARK OFFICE
CERTIFICATE OF CORRECTION

PATENT NO.    : 6,941,034 B2
DATED         : September 6, 2005
INVENTOR(S)   : Toru Kuboi

It is certified that error appears in the above-identified patent and that said Letters Patent is hereby corrected as shown below:

Column 11,
Line 38, "at east" should read -- at least --.

Column 12,
Line 4, "within" should read -- with m --.

Signed and Sealed this

Twenty-fourth Day of January, 2006

JON W. DUDAS
*Director of the United States Patent and Trademark Office*